US006639988B2

(12) United States Patent
Ashtiani et al.

(10) Patent No.: US 6,639,988 B2
(45) Date of Patent: Oct. 28, 2003

(54) PIEZO INTEGRATED FLAT SPEAKERS FOR AUTOMOTIVE INTERIOR PANELS

(75) Inventors: Mansour Ashtiani, Beverly Hills, MI (US); Charles J. Scheib, Kettering, OH (US); Emanuele Bianchini, Charlestown, MA (US); David J. Brace, Grosse Pointe, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/930,096

(22) Filed: Aug. 15, 2001

(65) Prior Publication Data

US 2002/0076061 A1 Jun. 20, 2002

Related U.S. Application Data

(60) Provisional application No. 60/229,837, filed on Aug. 31, 2000.

(51) Int. Cl.[7] ............................ H04B 1/00; H04R 3/00; H04R 25/00

(52) U.S. Cl. ......................... 381/86; 381/116; 381/117; 381/190

(58) Field of Search ........................... 381/86, 116, 117, 381/111, 190, 114

(56) References Cited

U.S. PATENT DOCUMENTS

| | | | | |
|---|---|---|---|---|
| 4,283,605 A | * | 8/1981 | Nakajima | 381/190 |
| 4,496,871 A | * | 1/1985 | Sumita et al. | 310/324 |
| 5,656,882 A | | 8/1997 | Lazarus et al. | 310/328 |
| 5,687,462 A | | 11/1997 | Lazarus et al. | 29/25.35 |
| 5,736,808 A | | 4/1998 | Szilagyi et al. | 310/322 |
| 5,901,231 A | | 5/1999 | Parrella et al. | 381/86 |
| 6,069,433 A | | 5/2000 | Lazarus et al. | 310/333 |
| 6,181,797 B1 | | 1/2001 | Parrella et al. | 381/86 |
| 6,215,884 B1 | * | 4/2001 | Parrella et al. | 381/190 |
| 6,356,641 B1 | * | 3/2002 | Warnaka et al. | 381/190 |
| 6,396,197 B1 | * | 5/2002 | Szilagyi et al. | 310/328 |
| 6,427,017 B1 | * | 7/2002 | Toki | 181/170 |

* cited by examiner

*Primary Examiner*—Forester W. Isen
*Assistant Examiner*—Elizabeth McChesney
(74) *Attorney, Agent, or Firm*—Scott A. McBain

(57) ABSTRACT

A member for producing an audible sound in a vehicle including a speaker area having an upper surface and a lower surface, the speaker area being located on the member. A piezo bimorph is attached to the speaker area, the piezo bimorph including a first piezoelectric element attached to the upper surface of the speaker area, and a second piezoelectric element attached to the lower surface of the speaker area. An amplifier in electrical communication with the piezo bimorph, the amplifier supplying an electrical field to the piezo bimorph, the piezo bimorph causing the speaker area and the member to vibrate, causing an audible sound.

14 Claims, 24 Drawing Sheets

- *THE LOW FREQUENCY RANGE WAS ADDRESSED BY LOCATING THE ENTIRE ROW OF PIEZOS TOWARDS THE EDGE OF THE IP (NEAR THE OCCUPANT)*

*IMPEDANCE SEEN BY THE AMPLIFIER CAN BE ABOVE 2 OHMS*

*A 30 OHM RESISTOR WAS ADDED IN SERIES TO THE PIEZO PACKS TO ACHIEVE OVER 2 OHMS IMPEDANCE*

*ADDITIONAL COMPONENTS CAN BE USED (INCLUDING HIGHER RESISTANCE IN THE TRANSFORMER)*

- IP MEASURED IN TEST FIXTURE VS. SIMPLIFIED PANEL OF RECOMMENDED DIMENSIONS
- RESULTS SHOW GOOD CORRELATION ABOVE 800 Hz
  - SAME BASIC LEVEL
  - SIMILAR OVERALL RESPONSE
- BELOW 800 Hz RESPONSE IS DOMINATED BY OVERALL PANEL/IP SIZE

FIG. 21B
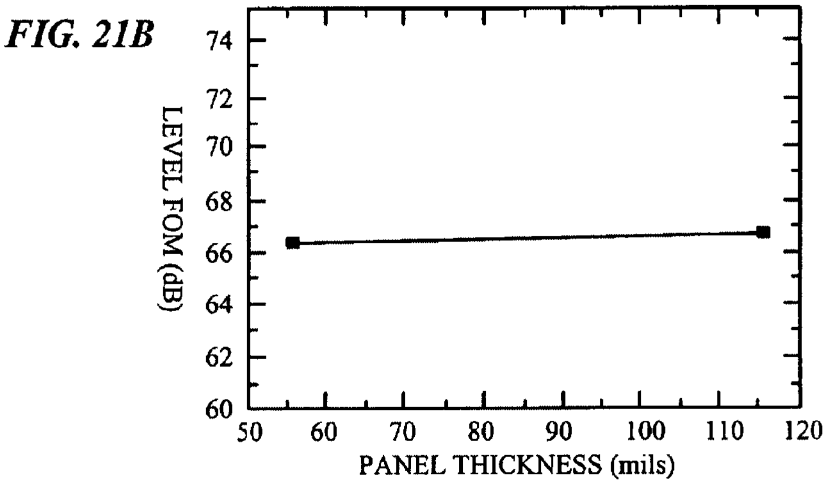
THINNER PANELS HAVE SLIGHTLY LOWER LEVEL
THINNER PANELS HAVE BETTER SMOOTHNESS
THINNER PANELS HAVE BETTER BANDWIDTH
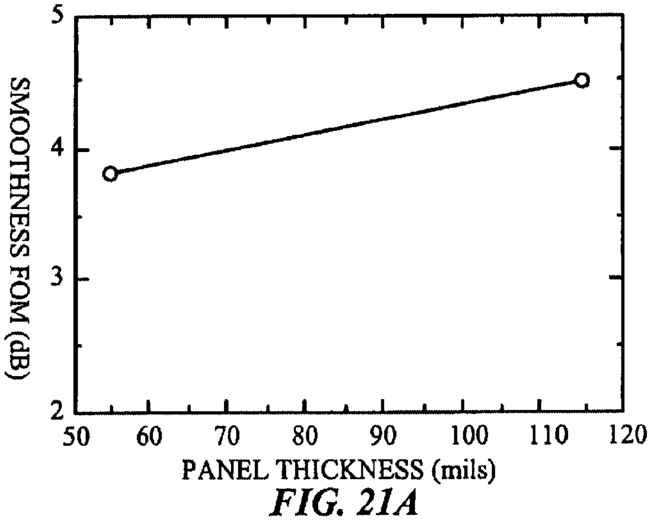
FIG. 21A
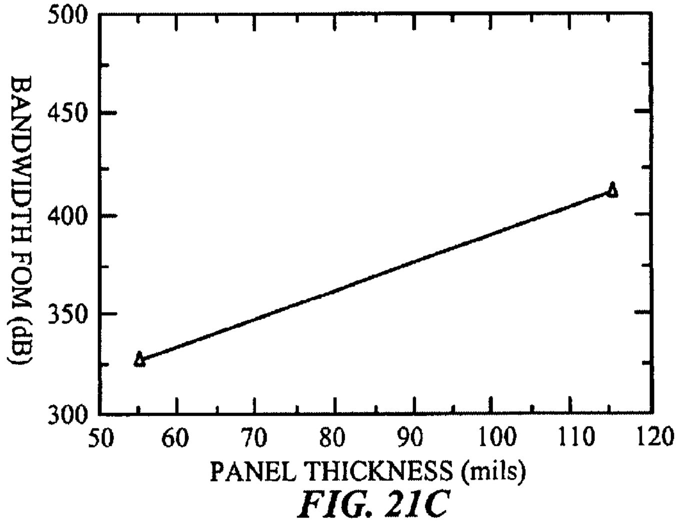
FIG. 21C

LOCALLY THINNER PANEL PROVIDES LOWEST LEVEL AT 75 MILS

LOCALLY THICKER PANEL IS SMOOTHER

LOCALLY THINNER PANEL HAS BROADER BANDWIDTH

*FIG. 23B*
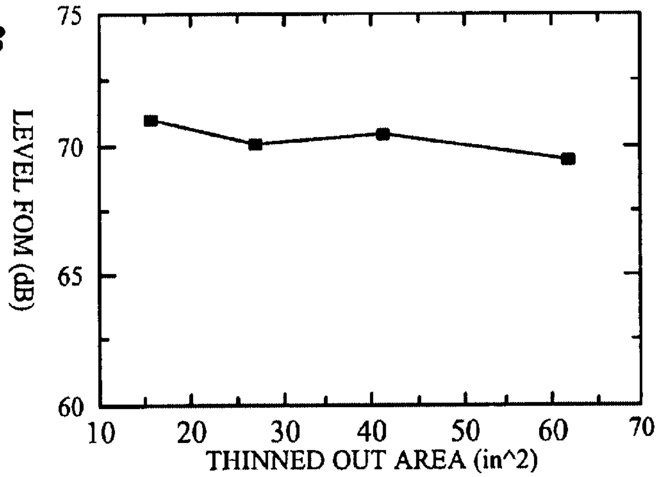
NO STRONG TREND FOR OUTPUT LEVEL
SMOOTHNESS IMPROVES AT LOWER THINNED OUT AREAS
BANDWIDTH STRONGLY DEPENDS ON THE THINNED OUT AREA
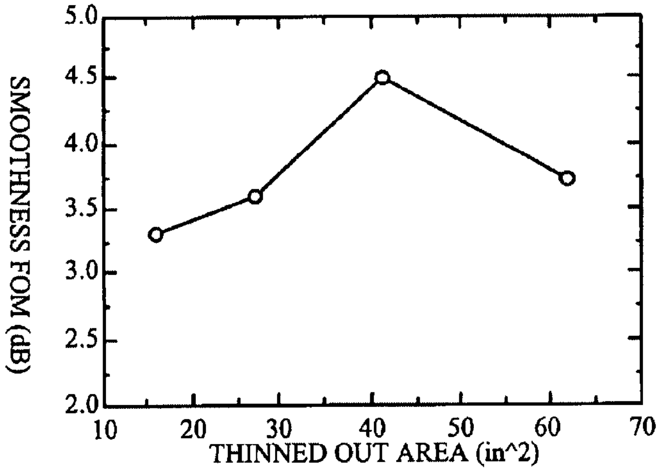
*FIG. 23A*
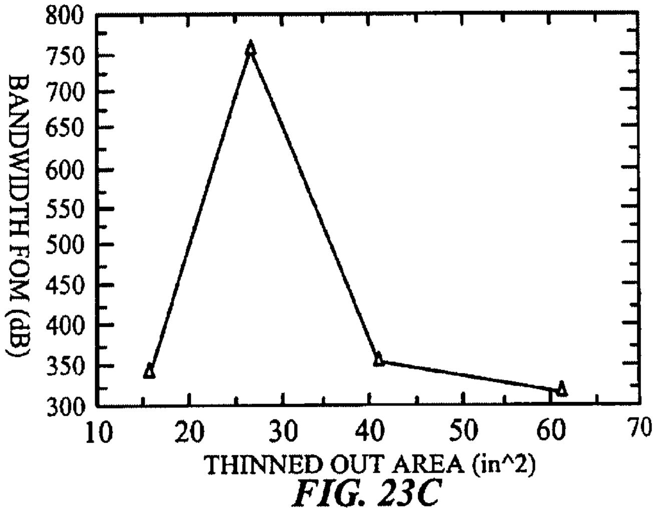
*FIG. 23C*

LEVEL INCREASES WITH NUMBER OF PIEZOS

SMOOTHNESS DECREASES WITH NUMBER OF PIEZOS

BANDWIDTH FLUCTUATES WITH PIEZO COMBINATION

DRIVING PIEZOS OUT OF PHASE WILL REDUCE OVERALL LEVEL

SMOOTHNESS CAN BE IMPROVED THROUGH PHASING

BANDWIDTH CAN BE INCREASED THROUGH PHASING

- BIMORPH DESIGN IMPROVES LEVEL BY ABOUT 6 dB
- SLIGHT REDUCTION IN SMOOTHNESS
- SLIGHT REDUCTION IN BANDWIDTH

PIEZO INTEGRATED FLAT SPEAKERS FOR AUTOMOTIVE INTERIOR PANELS

CROSS-REFERENCE TO RELATED APPLICATIONS

This application claims the benefit of U.S. Provisional Patent Application, No. 60/229,837, filed on Aug. 31, 2000, the contents of which are incorporated herein by reference thereto.

BACKGROUND

Loud speakers are utilized in vehicles to produce sound from a radio, tape player, and/or compact disc player. The inclusion of such speakers within the vehicle requires additional assembly steps and modifications to components of the vehicle. The speakers may add weight to the vehicle and also take up space within the same (especially in thickness direction), creating packaging, fuel economy, and cross-platform modularity issues. In addition, loudspeakers need grills to protect the delicate speaker cone, which can also add cost or tooling complexity. The grills are often visible, which can be undesirable to the user of the vehicle.

SUMMARY

A flexible structural member for producing an audible sound in a motor vehicle includes a speaker area having an upper surface and a lower surface, and a piezo bimorph attached to the speaker area. The piezo bimorph includes a first piezoelectric element attached to the upper surface and a second piezoelectric element attached to the lower side and proximate to the first piezoelectric element. An amplifier is used to drive the piezo bimorph and supplies an electrical field to the piezo bimorph.

A method of creating sound in a vehicle includes attaching a first piezoelectric element to an upper surface of an interior trim, and a second piezoelectric element to a lower surface of the interior trim, proximate to the first piezoelectric element. The method also includes attaching an amplifier in electrical communication with the first piezoelectric element and the second piezoelectric element, and applying an electric field to the first piezoelectric element and the second piezoelectric element. After the electric field is applied, the interior trim vibrates and creates sound. (The appropriate number of piezo Biomorphs are used depending on the desired out put level of dB for the sound required for the particular vehicles).

The above-described and other features and advantages of the present invention will be appreciated and understood by those skilled in the art from the following detailed description, drawings, and appended claims.

BRIEF DESCRIPTION OF THE DRAWINGS

FIGS. 21A–21C are graphs illustrating performance vs. panel thickness;

FIGS. 23A–23C are graphs illustrating performance vs. panel thickness;

DETAILED DESCRIPTION

Figure 1:
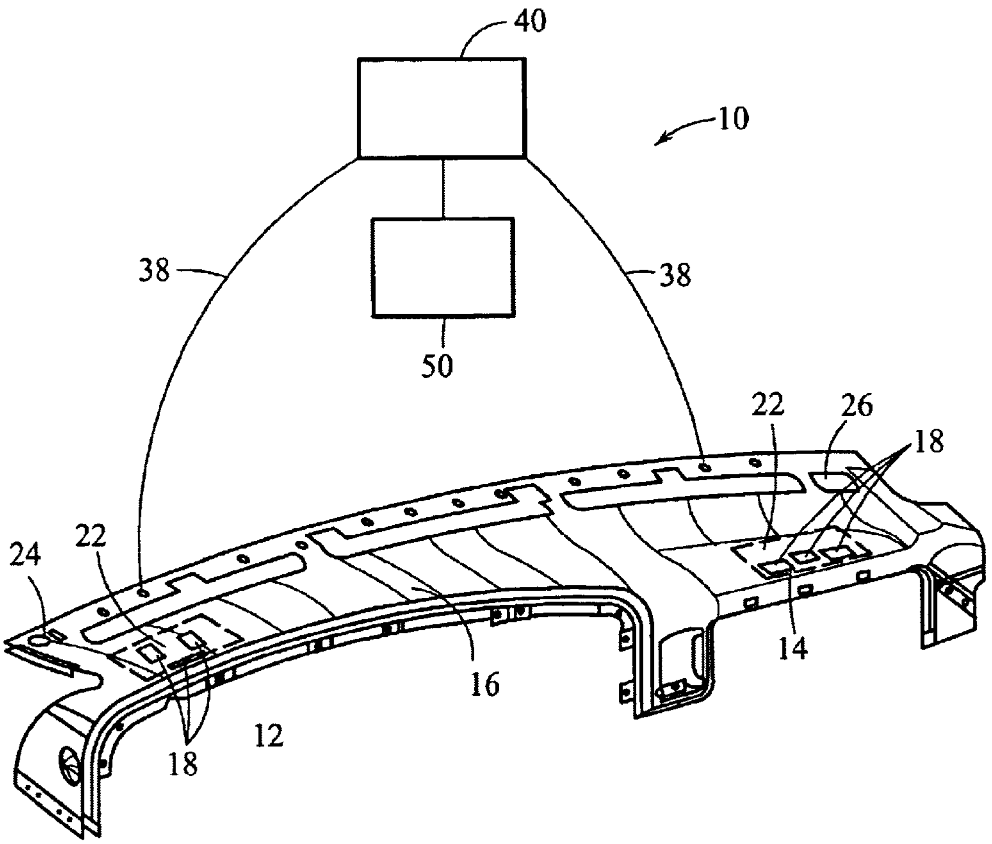
FIG. 1 is a perspective view of an instrument panel of a vehicle with piezo bimorphs in speaker areas.

FIG. 1 illustrates an audio sound system 10 constructed in accordance with an exemplary embodiment of the present invention. Audio sound system 10 includes a first speaker area 12 and a second speaker area 14. Speaker areas 12 and 14 are located on an interior trim portion 16 of a vehicle. In an exemplary embodiment, interior trim portion 16 is an instrument panel, which has a thickness of about 0.1 inches. Alternatively, speaker areas 12 and 14 may be located on any interior trim portion of a vehicle, which may vary in thickness.

First speaker area 12 and second speaker area 14 each include at least one piezo bimorph 18 on an interior trim portion 16 of a vehicle. In an exemplary embodiment, both first speaker area 12 and second speaker area 14 include three piezo bimorphs 18 approximately in line with one another and approximately 1 inch apart. Of course, piezo bimorphs 18 may be at a distance of greater than or less than 1 inch apart. Alternatively, first speaker area 12 and second speaker area 14 may include more or less piezo bimorphs.

As stated above, an exemplary embodiment includes employing an instrument panel with first speaker area 12 and second speaker area 14, both speaker areas including three piezo bimorphs 18, each approximately in line with each other and located approximately 1" apart from each other.

There are several advantages to employing this configuration. First, utilizing three piezo bimorphs enables the instrument panel to vibrate in such a manner that the instrument panel has good performance and produces a quality sound. If less than three piezo bimorphs are employed, then the instrument panel is not vibrated enough to produce a quality sound. If more than three piezo bimorphs are utilized more cost will be associated with the solution, and the transformer will have to be adapted for the increase in piezo capacitance. Moreover, if additional piezo bimorphs are used, additional power is needed to drive the piezo bimorphs. Second, if the piezo bimorphs are located closer together than one inch, less area will be affected, leading to a lower sound output. If the piezo bimorphs are located further apart, the piezo bimorphs begin to work independently of each other instead of together to move the instrument panel. Therefore the location of the biomorphs had to be optimized for best performance.

Audio sound system 10 also includes an amplifier 40 in electrical communication with speaker areas 12 and 14. In an alternative embodiment, audio sound system 10 includes a subwoofer speaker 50, which is in electrical communication with audio sound system 10. Subwoofer speaker 50 allows audio sound system 10 to achieve lower frequencies.

Figure 2:
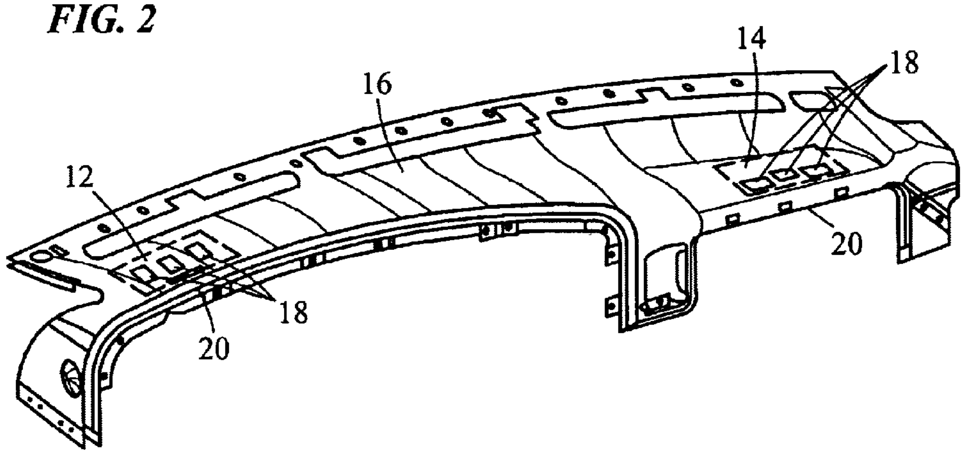
FIG. 2 is a perspective view of an alternative embodiment of the FIG. 1 embodiment.
Figure 11:
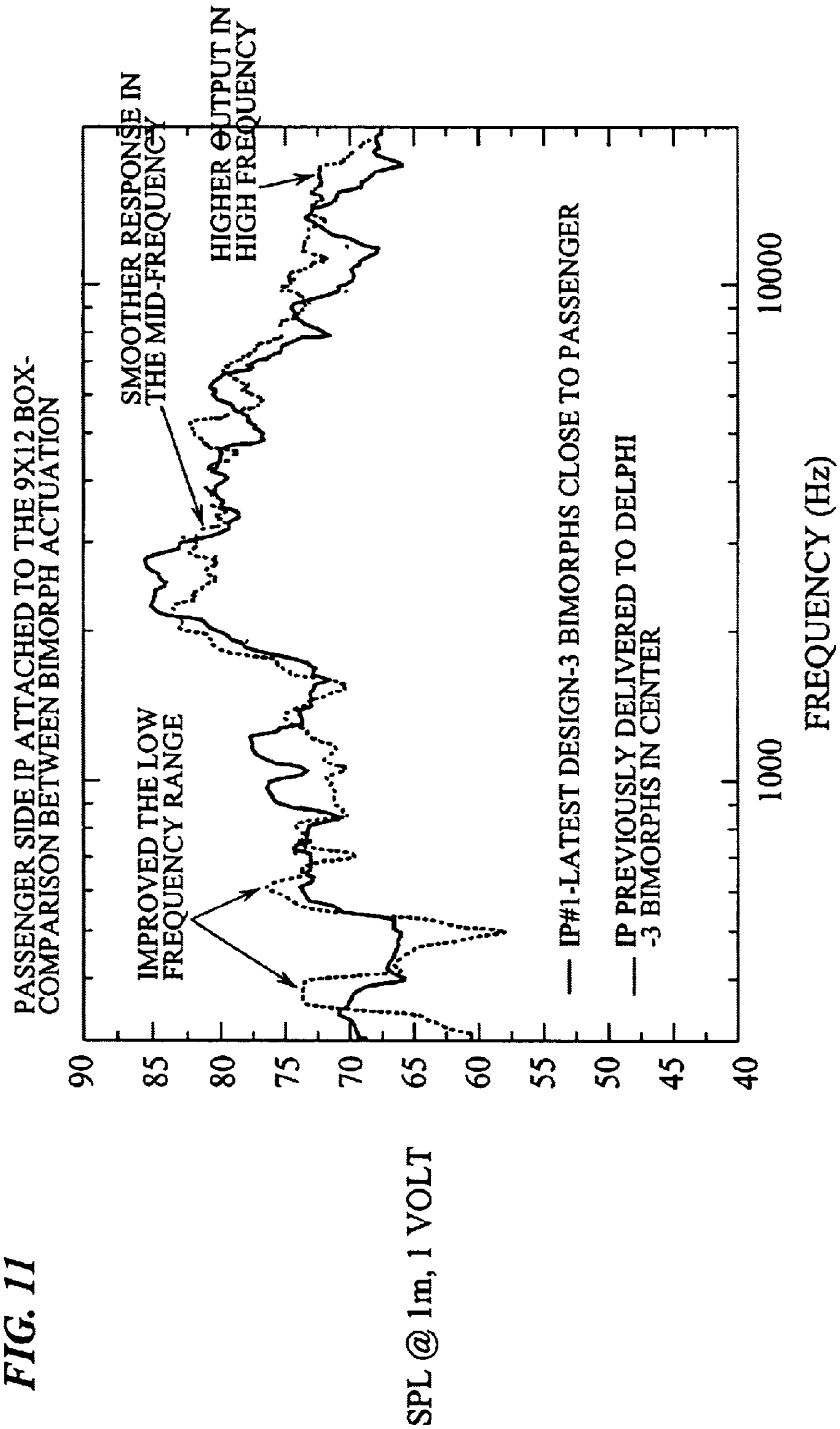
FIG. 11 is a graph showing the low frequency range that was obtained by the piezo bimorphs in accordance with an exemplary embodiment of the present invention.

Referring to FIG. 2, it is also desirable to locate piezo bimorphs 18 proximate to an edge 20 of interior trim portion 16. By locating piezo bimorphs 18 proximate to edge 20, there is an increase in the vibration of interior trim portion 16 in the low frequency band which is very desirable. This is due to the specific mode shape of the instrument panel. It was found that at lower frequencies (300–800 Hz), the selected areas of the instrument panel were most active. A preferred distance from edge 20 of interior trim portion 16 is about 1 inch. FIG. 11 is a graph that demonstrates the improved quality of sound.

Figure 3:
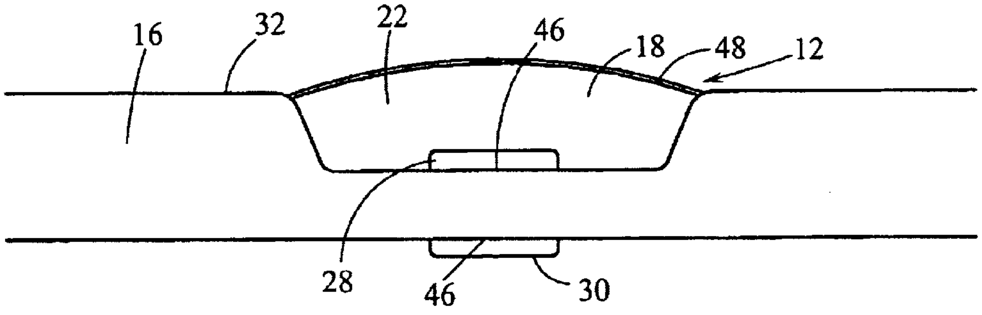
FIG. 3 is a cross-sectional view of a recessed speaker area.

Moreover, and referring now to FIGS. 1 and 3, piezo bimorphs 18 may also be attached to interior trim portion 16 in a recessed area 22. By recessing the area, interior trim portion 16 is thinner in speaker areas 12 and 14, which enables interior trim portion 16 to produce more displacement and vibration. By producing more displacement, lower frequencies can be attained. As shown, recessed area is about 9 inches by about 12 inches, but may be larger or smaller. Recessed area 22 may be thinned to about 0.05 inches as opposed to about 0.1 inches, which is the approximate thickness of interior trim portion 16 in the unrecessed areas. If recessed area 22 is thinned out so that interior trim portion 16 is less than about 0.05 inches, the structural integrity of interior trim portion 16 may be compromised.

Even though piezo bimorphs 18 form first speaker area 12 and second speaker area 14, sound is actually produced from the entire interior trim portion 16. First speaker area 12 and second speaker area 14 vibrate the entire interior trim portion 16, and thus the entire interior trim portion 16 creates sound. By vibrating the entire interior trim portion 16, a surround sound effect is produced. Also, the position of the instrument panel near the windshield causes the sound to travel to the windshield and bounce back and radiate in all directions within the interior of the vehicle. In addition, it is desirable to locate first speaker area 12 at a first side 24 of interior trim portion 16 and second speaker area 14 at a second side 26. When first speaker area 12 and second speaker area 14 are at either end of interior trim a better stereo separation can be achieved.

Figure 4:
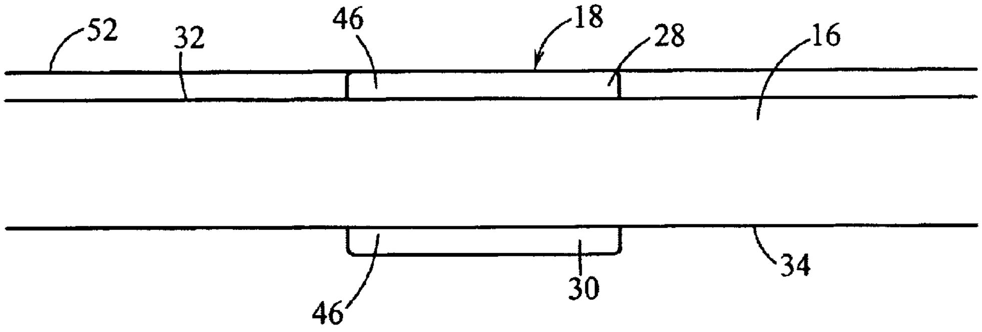
FIG. 4 is a cross-sectional view of a piezo bimorph.

Referring to FIG. 4, piezo bimorph 18 includes a first piezoelectric element 28, which is located on an upper surface 32 of interior trim portion 16 and a second piezoelectric element 30, which is located on a lower surface 34 of interior trim portion 16. In an exemplary embodiment, first piezoelectric element 28 may be positioned directly over second piezoelectric element 30. However, such location is not required to have piezo bimorph 18 to function properly.

It is preferable to have first piezoelectric element 28 positioned directly over second piezoelectric element 30, with interior trim portion 16 interposed between the two elements. When piezoelectric elements 28 and 30 receive an electric field from amplifier (shown as 40 in FIG. 1), each piezoelectric element 28 and 30 expands and contracts, which in turn cause a (displacement) vibration with interior panel portion 16. As interior panel portion 16 vibrates, it displaces air and functions as a speaker. If first piezoelectric element 28 is positioned directly over second piezoelectric element 30, then the two elements can work together synergistically and produce a greater bending and displacement of the interior panel portion 16. When first piezoelectric element 28 expands, second piezoelectric element 30 contracts, leading to a combined motion of the structure which is larger than the two separate piezo contributions.

The two piezo elements are driven “out-of-phase” (one expands, one contracts). To make a bimorph; multiple bimorphs can be driven in or out of phase if the sound output needs to be smoothed-out (for example, the current design has 3 in-phase bimorphs, but greater smoothness can be achieved if one is driven out of phase from the other two). Thus, as an alternative and as may be required, one bimorph may be driven out of phase from the other two. Such a configuration provides for a larger bending movement of interior panel trim 16 and leads to higher sound pressure level output.

Figure 5:
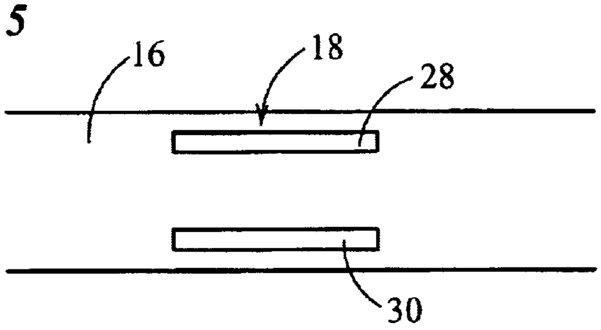
FIG. 5 is a cross-sectional view of piezo bimorph embedded into a surface of a vehicle.
Figure 6:
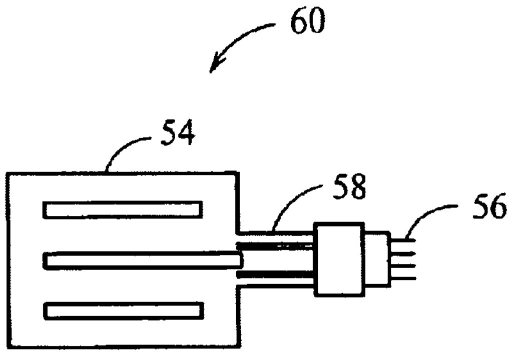
FIG. 6 is a piezoelectric actuator utilized as part of a piezo bimorph.

In an exemplary embodiment, piezoelectric elements 28 and 30 are attached to interior trim portion 16 by bonding with an adhesive material 46 (as shown on FIG. 6). Piezoelectric element 28 is bonded to upper surface 30 with adhesive material 46, and piezoelectric element 30 is bonded to lower surface 32 with adhesive material 46. In an exemplary embodiment, adhesive material is an epoxy material, which should be spread in a uniform, thin, stiff bond layer. A thinner, stiffer bond layer produces a better bond for piezoelectric elements 28 and 30. In another embodiment, piezoelectric elements 28 and 30 are bonded to upper surface and bottom surface, respectively, with an adhesive tape. Referring to FIG. 5, alternatively, piezoelectric elements 28 and 30 may be embedded into interior trim portion 16. Finally, any method of attaching piezoelectric elements 28 and 30 to interior trim portion 16 may be utilized so long as piezoelectric elements 28 and 30 are secured to interior trim portion 16.

In an exemplary embodiment, piezoelectric elements 28 and 30 may include piezoelectric actuators, which have been developed by Active Control eXperts, Inc. (ACX) and are commercially available under the name of QuickPack. FIG. 6 illustrates a piezoelectric actuator 60, which is more fully described in Lazarus, U.S. Pat. No. 6,069,433, Lazarus, U.S. Pat. No. 5,687,462, and Lazarus, U.S. Pat. No. 5,656,882, the contents of which are incorporated in their entirety herein by reference thereto. In an exemplary embodiment, a QuickPack model number QP15W is utilized; however, any type of QuickPack unit may be employed. Piezoelectric actuator 60 is preferable because it provides a thin complete modular unit, which includes a protective coating 54 over the piezoelectric element, and it includes wires 56 and electronics 58. Thus, the QuickPack provides for ease of assembly and integration with interior trim portion 16. Moreover, QuickPacks provide protection for the piezoelectric element because of the manner in which the devices are packaged, thereby protecting the device when it is attached to interior trim portion 16. Piezoelectric element 28 and 30 may also include other piezoelectric elements known in the art.

Referring to FIGS. 4 and 6, the QuickPack device may have a thickness of about 0.01 inch. The QuickPack device has a protective covering 54 that protects the piezoelectric element contained within the QuickPack device. Thus, it is not necessary to cover piezoelectric elements 28 and 30 because the QuickPack device is already protected. However, for aesthetic reasons one could paint over the piezo QuickPacks same coating as is painted on the rest of the instrument panel. In the alternative, if the QuickPack device is not utilized, piezoelectric elements 28 and 30 are about 0.005 inch in thickness. In that situation, it may be desirable to cover piezoelectric element 28 because it is located on upper surface 32 of interior trim portion 16 so that it is protected. It should be noted that it is not necessary to cover piezoelectric elements 28 and 30 in order for them to function properly.

Referring to FIG. 4, in the exemplary embodiment, it is desirable to cover piezoelectric element 28 with a material 52, which is located on upper surface 32 for aesthetic purposes. Material 52 may be paint, which is used to paint interior trim portion 16. Material 52 may also be a liquid injection molding, which is applied over first piezoelectric element 28 and produces a thin skin layer over first piezoelectric element 28. Referring to FIG. 5, in another embodiment, first piezoelectric element 28 and second piezoelectric element 30 may be embedded in interior trim portion 16.

Referring to FIGS. 1 and 3, in the event that first speaker area 12 and second speaker area 14 are recessed, first speaker area 12 and second speaker area 14 may be covered in the same manner as when speakers are not recessed. In addition, first speaker area 12 and second speaker area 14 may be covered with an ornamental grill 48. However, one of the advantages of employing piezoelectric elements for first speaker area 12 and second speaker area 14 is so that speaker grills are not necessary.

Referring to FIG. 1, in an exemplary embodiment, interior trim portion 16 is an instrument panel. Instrument panel may be constructed from polycarbonate plastic with a painted polycarbonate substrate and in which there is no foam and no surface material. Alternatively, the material may also be any microcellular structure material or any anisotropic material including Nano-composite injection molded materials. The material is preferably one that will give high modulus and low density so that the piezoelectric actuators will be able to more easily drive it.

Figure 7:
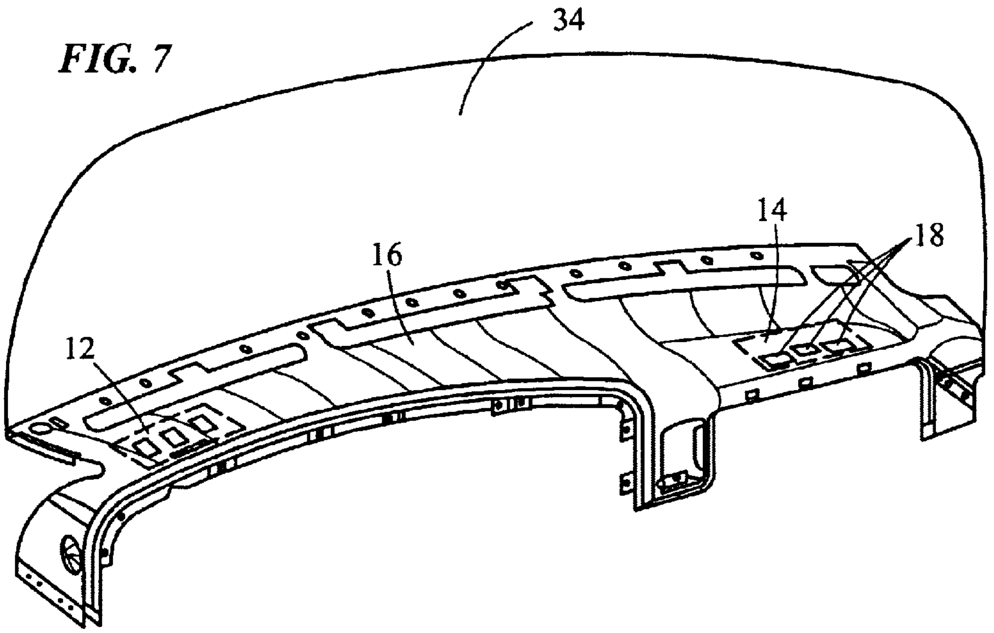
FIG. 7 is a perspective view of an instrument panel and a windshield of a vehicle.
Figure 8:
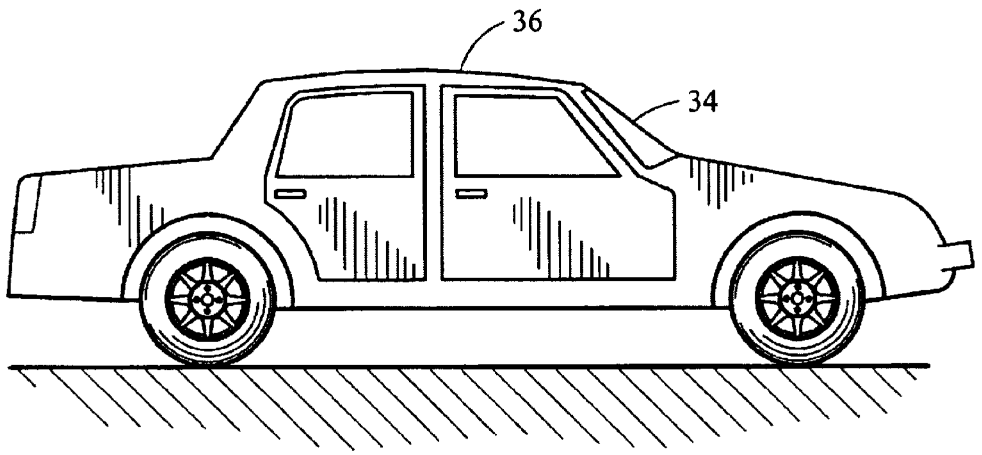
FIG. 8 is a side view of a vehicle.

Referring to FIGS. 7 and 8, there are several benefits to employing an instrument panel as the location of piezo bimorphs 18. First, because the instrument panel is located close to a windshield 34 of a vehicle 36, windshield 34 helps to reflect the sound into vehicle 36. This helps to enhance the surround sound effect. Second, the instrument panel has a large surface which enables piezo bimorphs 18 to create better vibration and ultimately a higher sound pressure level output and a better sound.

Figure 9:
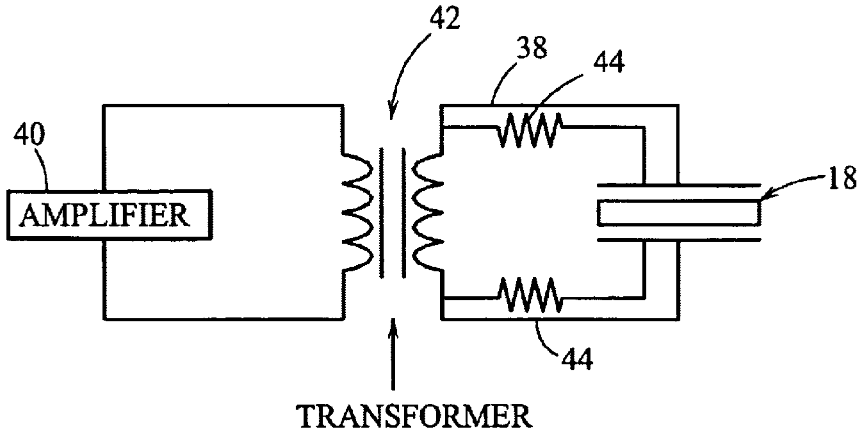
FIG. 9 is an electrical diagram of an audio sound system.

Referring to FIGS. 4 and 9, audio sound system 10 functions by establishing an electrical communication 38 between an amplifier 40 and piezo bimorph 18. Amplifier 40 sends an electric field with a predetermined voltage to piezo bimorph 18, which includes first piezoelectric element 28 and second piezoelectric element 30. Alternatively, a transformer 42 may also be employed to increase the voltage to piezo bimorph 18. When piezoelectric elements 28 and 30 receive an electric field, each piezoelectric element expands and contracts, which in turn causes a vibration of interior panel portion 16. As interior panel portion 16 vibrates, it displaces air and creates an audible noise.

Figure 12:
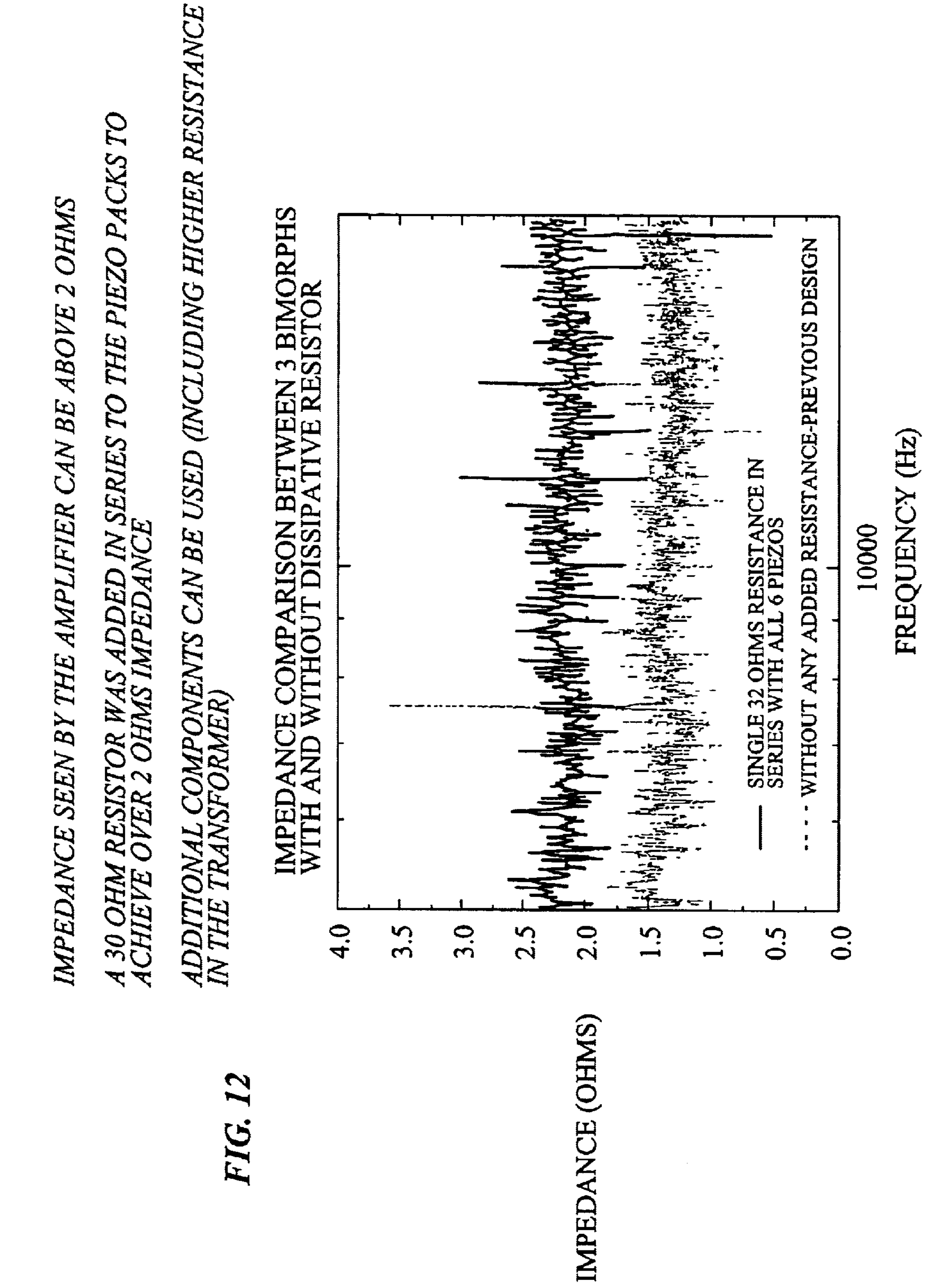
FIG. 12 is a graph showing the impedance gained by using a resistor in series with the piezo bimorphs.

Alternatively, as exemplified by dashed lines, piezo bimorphs 18 are also connected in series with a resistor 44. The addition of resistor 44 in the circuit leads to an increase in impedance, which is more desirable for amplifier 40. However, it must also be noted that by utilizing resistor 44, a lower output in the high frequencies may also occur. FIG. 12 is a graph that demonstrates the effect that a resistor may have on the impedance of the audio sound system.

Figure 10:
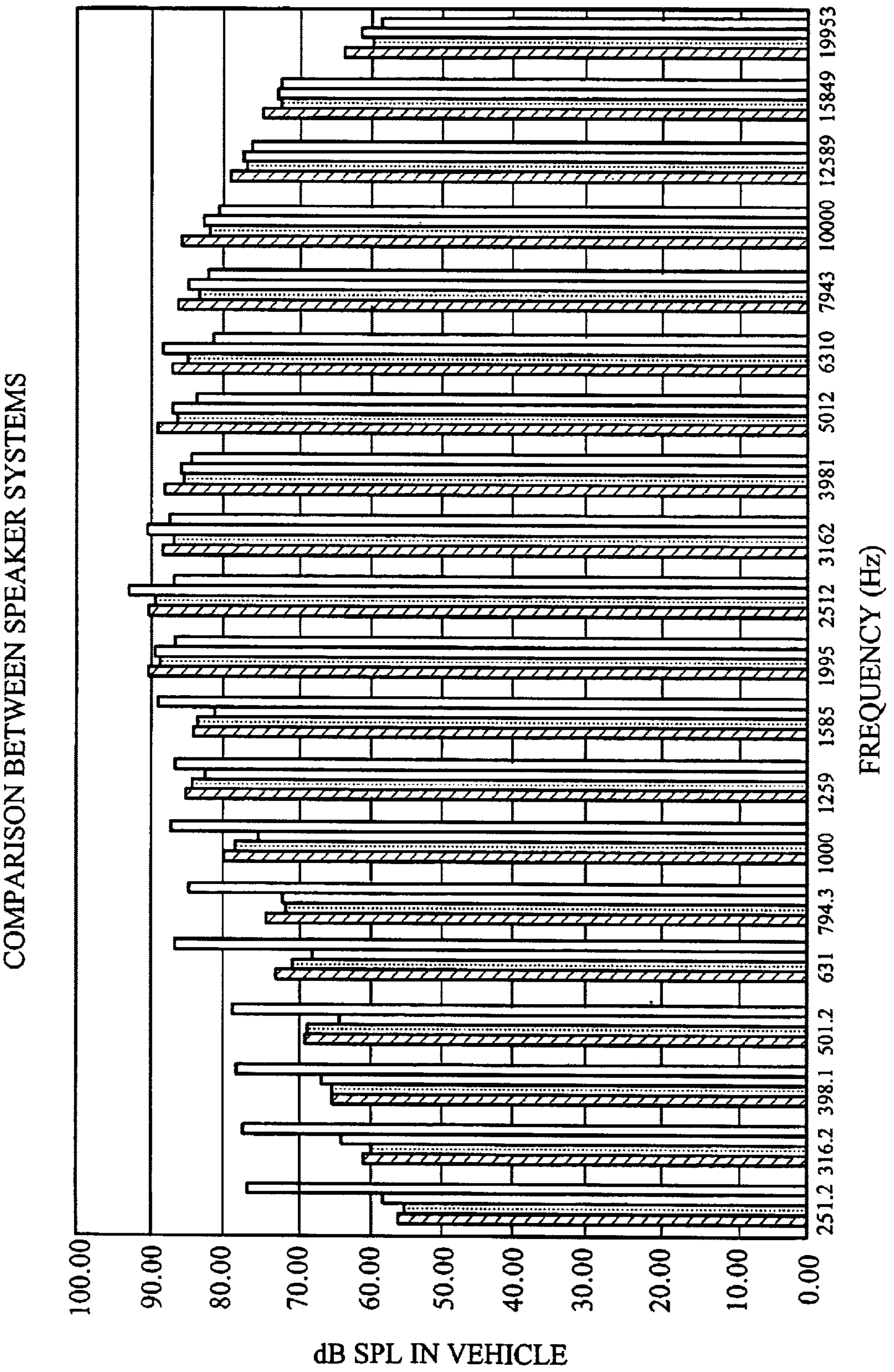
FIG. 10 is a chart demonstrating the sound pressure level versus the frequency of a piezo speaker and a loud speaker.

Referring to FIG. 1, first speaker area 12 and second speaker area 14 can produce frequencies as low as about 300 Hz to as high as about 20,000 Hz. Thus, audio sound system 10 may also comprise subwoofer speaker 50 so that lower frequencies may be attained by audio sound system 10. FIG. 10 illustrates how audio sound system 10 functions as compared to typical loudspeakers.

Figure 13:
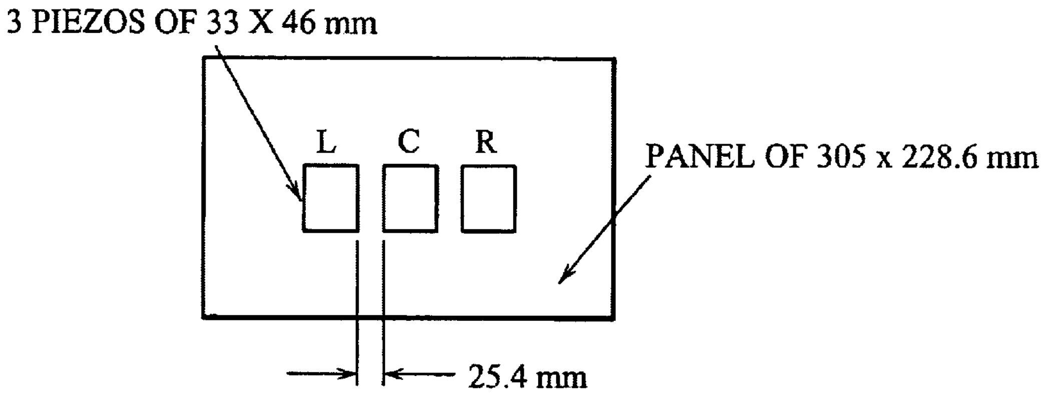
FIG. 13 is a top plan view of a configuration of the piezo bimorphs.
Figure 14:
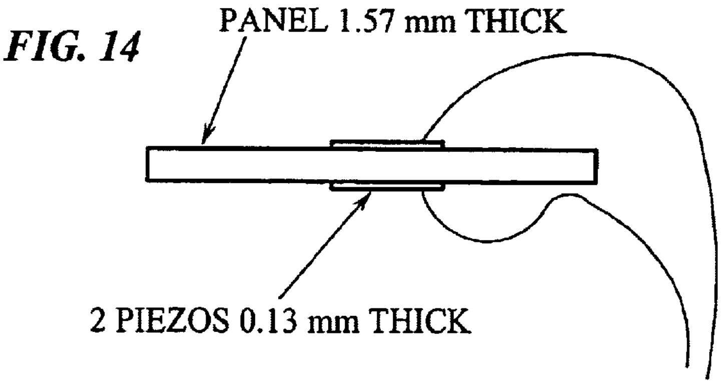
FIG. 14 is a cross-sectional view of a piezo bi-morph configuration.
Figure 15:
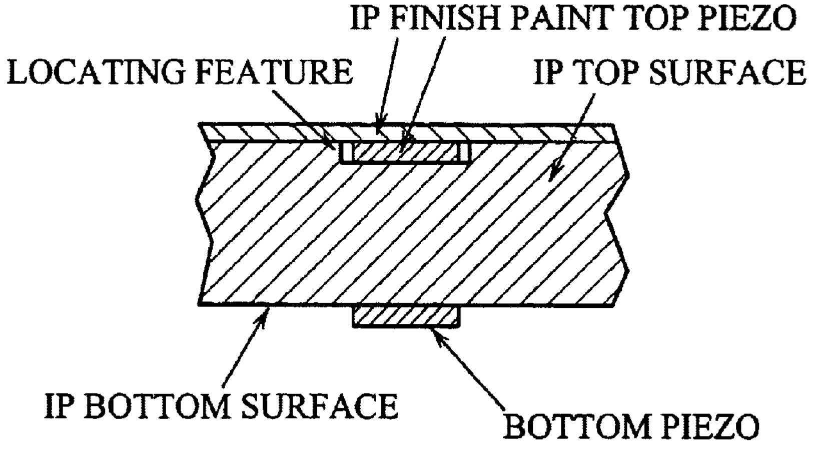
FIG. 15 is a cross-sectional view illustrating an alternative configuration of the piezo bi-morph.
Figure 16:
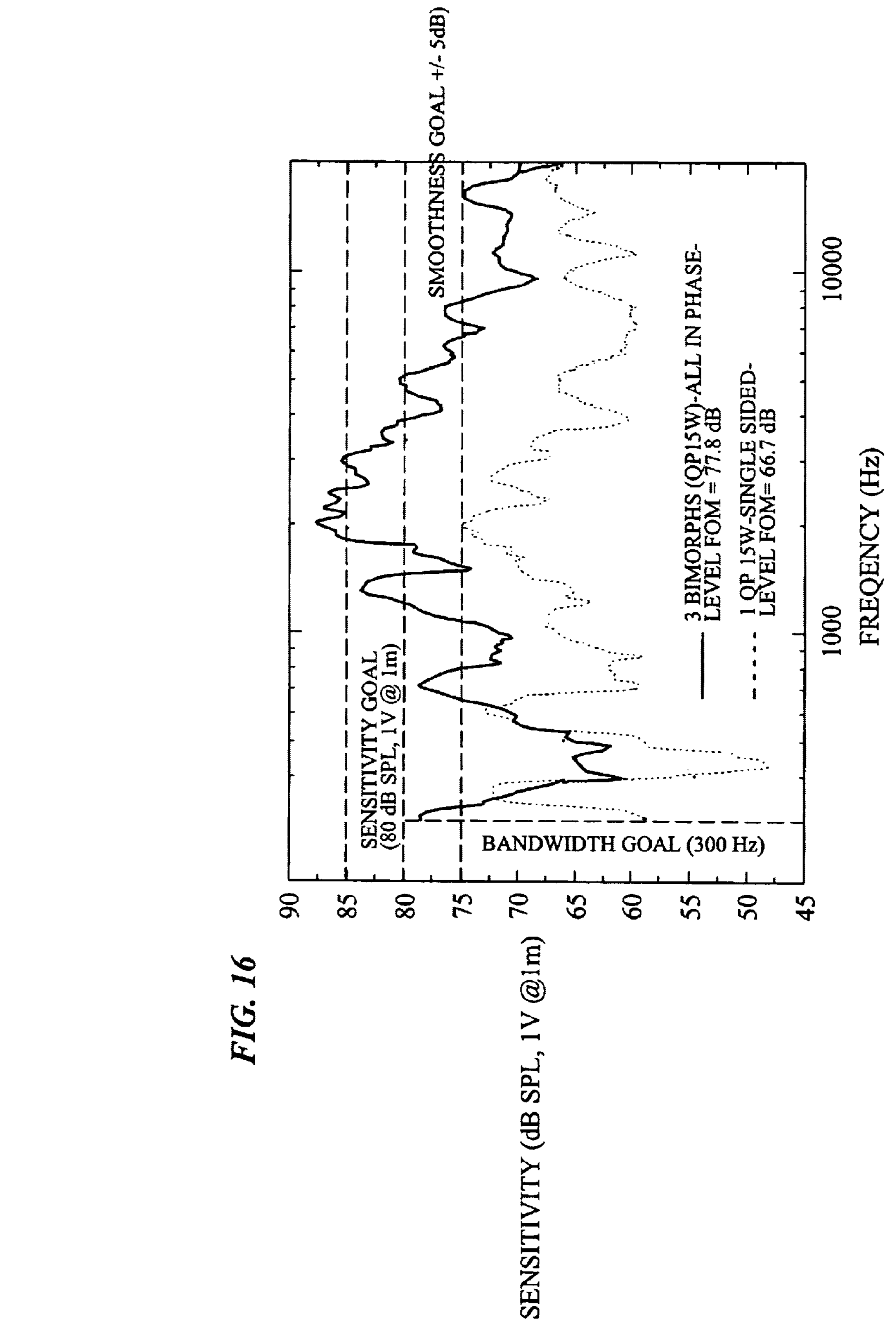
FIG. 16 is a graph illustrating a comparison of single piezo being compared to three bi-morph piezos.
Figure 17:
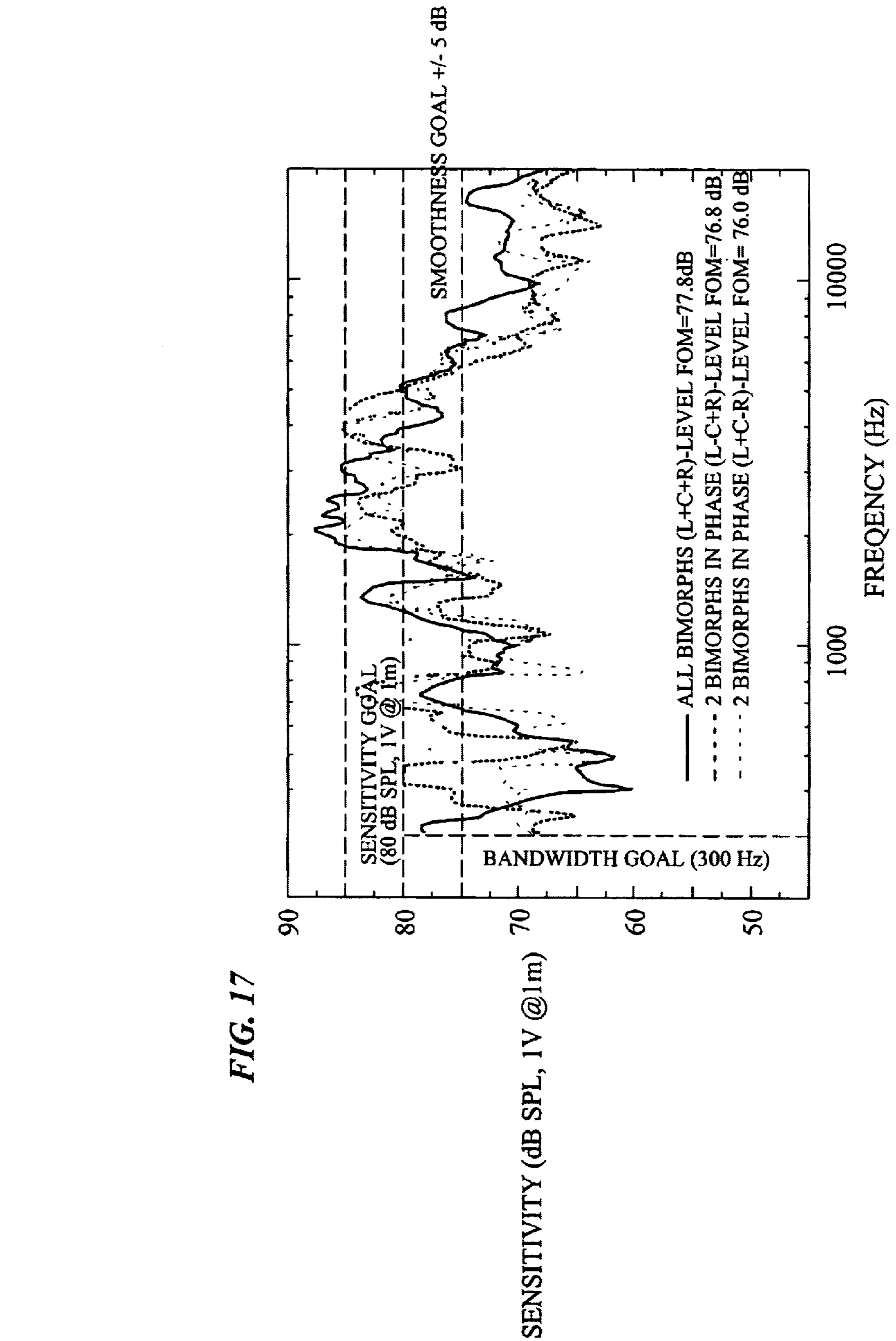
FIG. 17 is a graph illustrating a comparison of the piezo bi-morphs with selective phasing.
Figure 18:
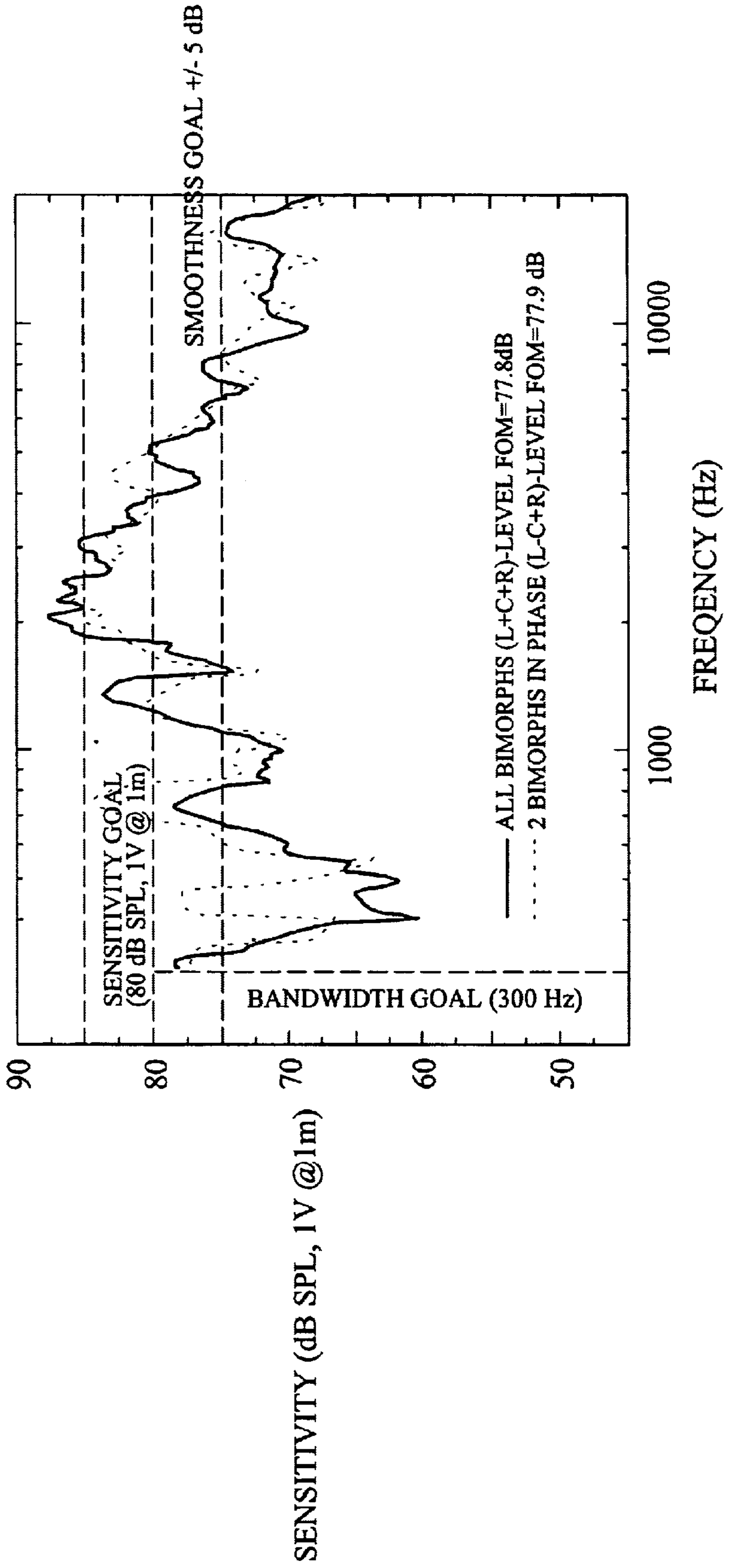
FIG. 18 is a graph illustrating a comparison of three bi-morphs versus two bi-morphs.
Figure 19:
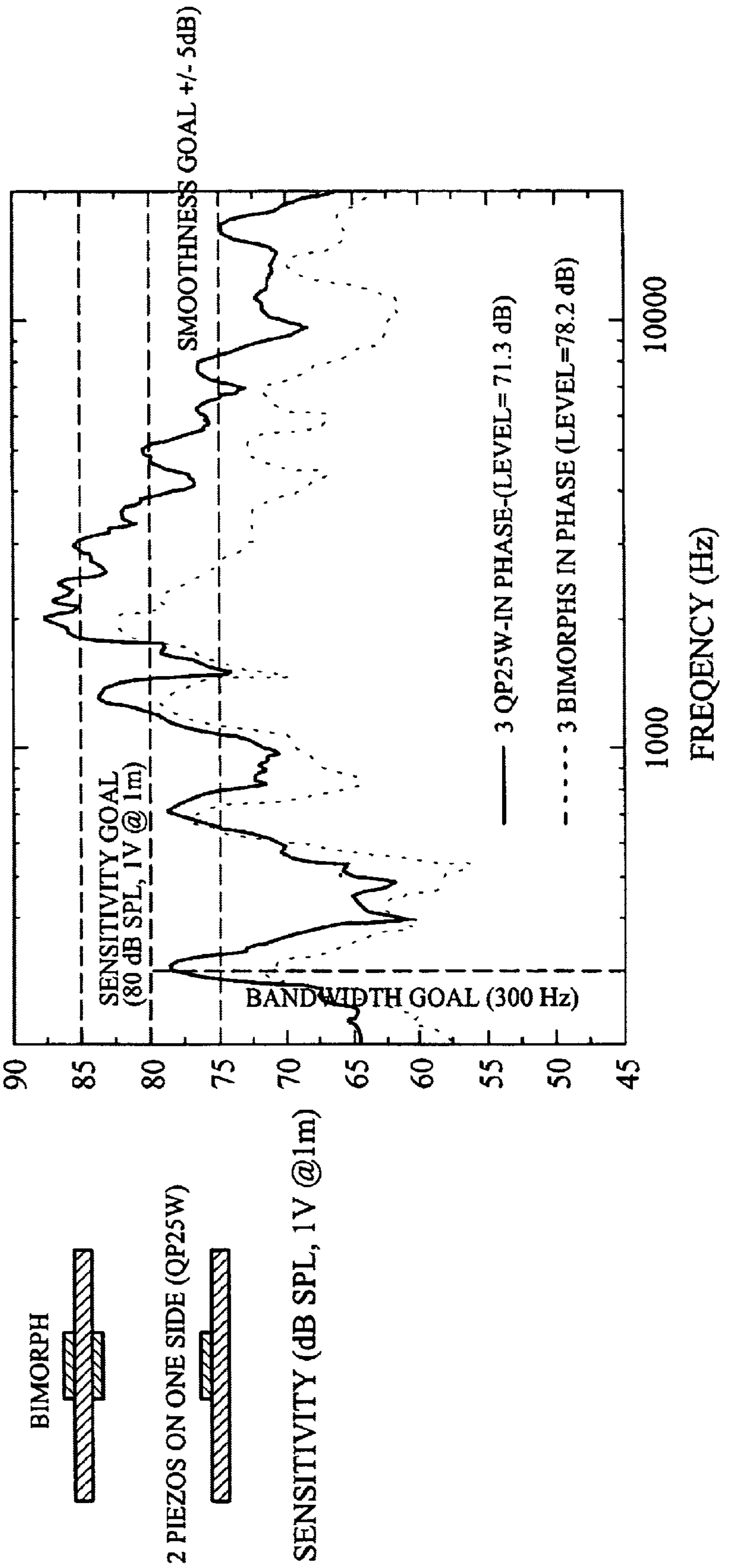
FIG. 19 is a graph illustrating a comparison between three bimorphs versus piezos on a single side.
Figure 20:
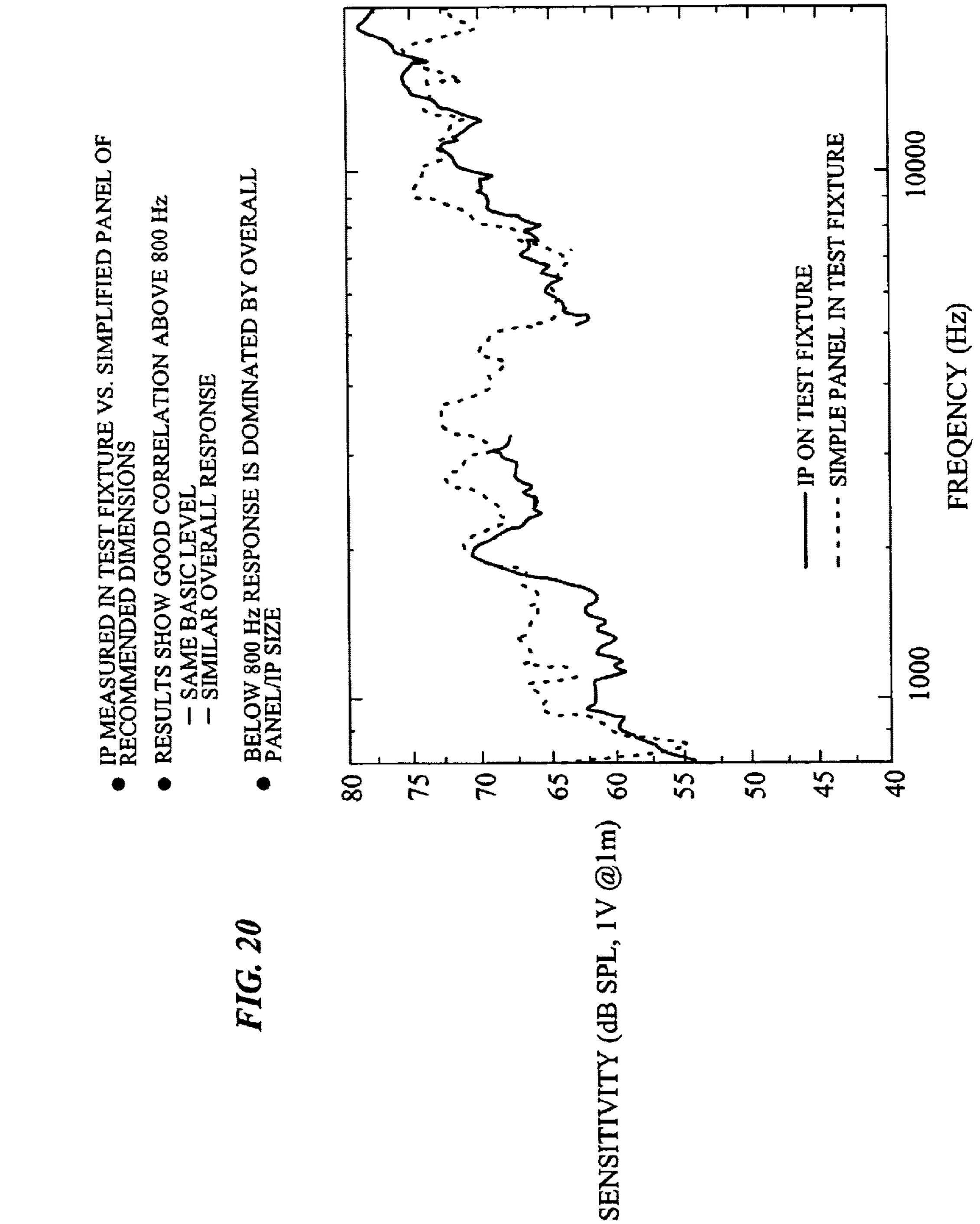
FIG. 20 is a graph illustrating a comparison between a test fixture and an instrument panel.
Figure 22B:
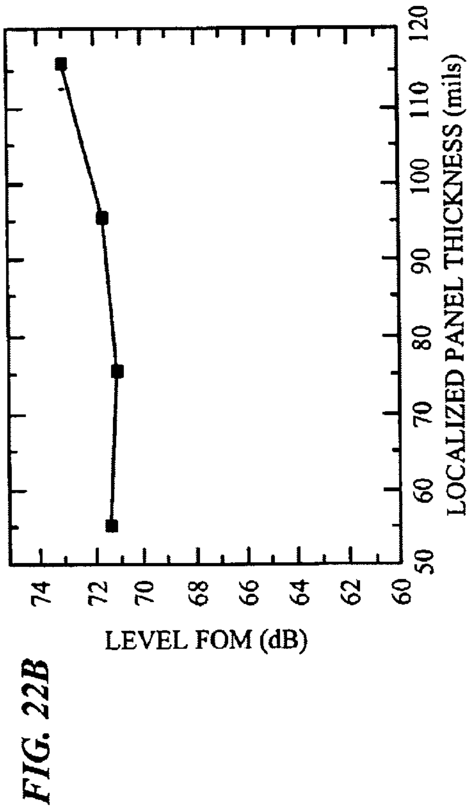
FIGS. 22A–22C are graphs illustrating performance vs. panel thickness.
Figure 22C:
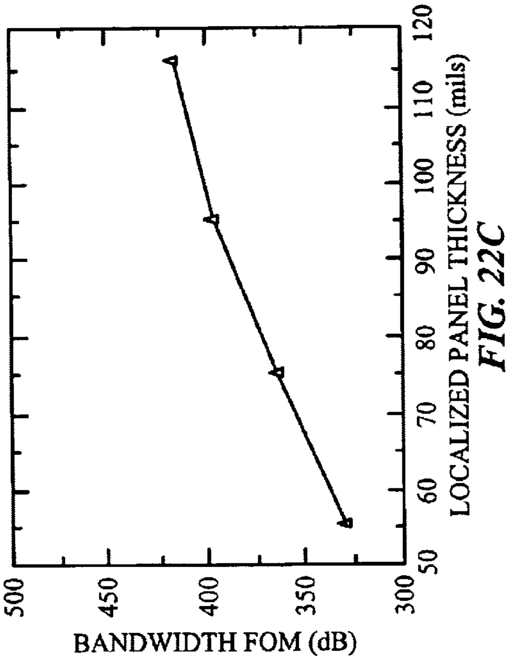
Figure 22A:
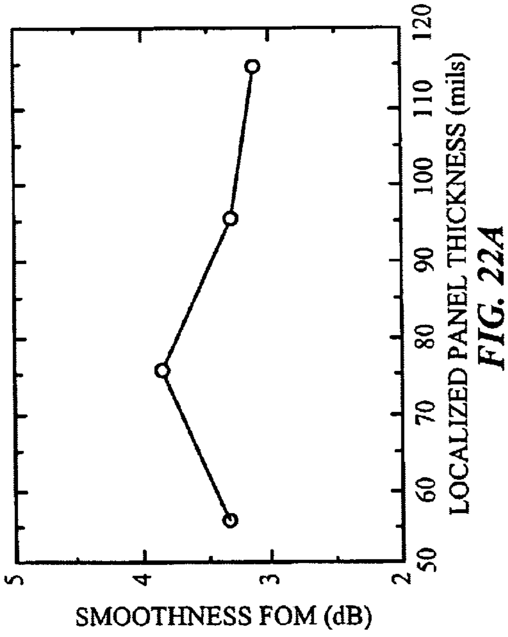
Figure 24B:
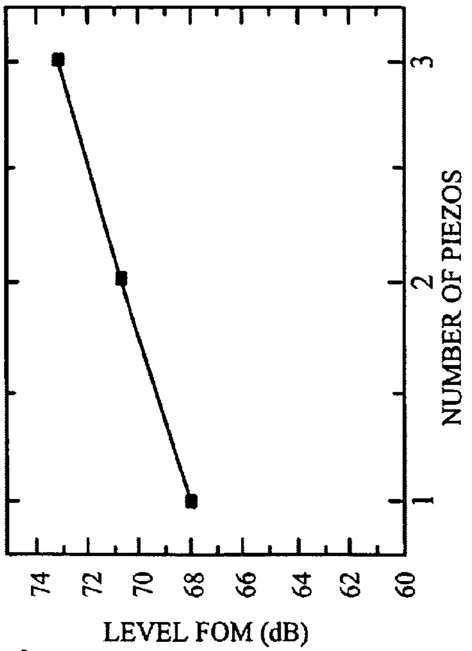
FIGS. 24A–24C are graphs illustrating performance vs. number of piezos.
Figure 24C:
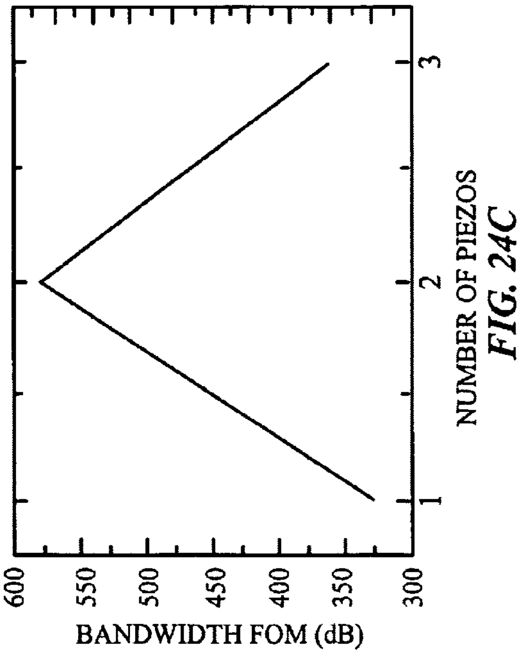
Figure 24A:
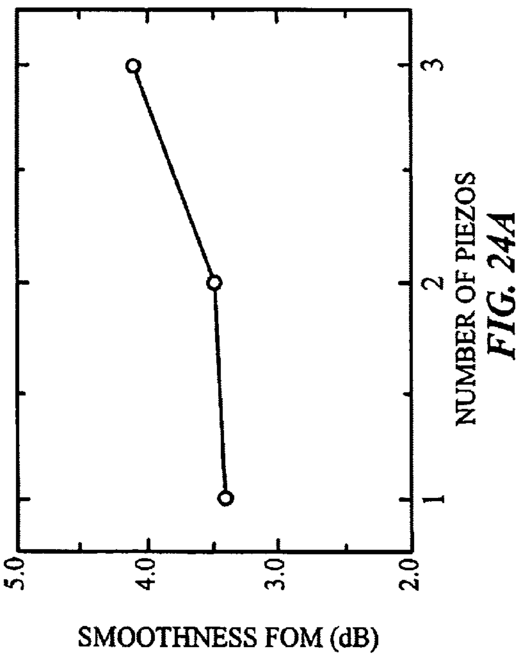
Figure 25B:
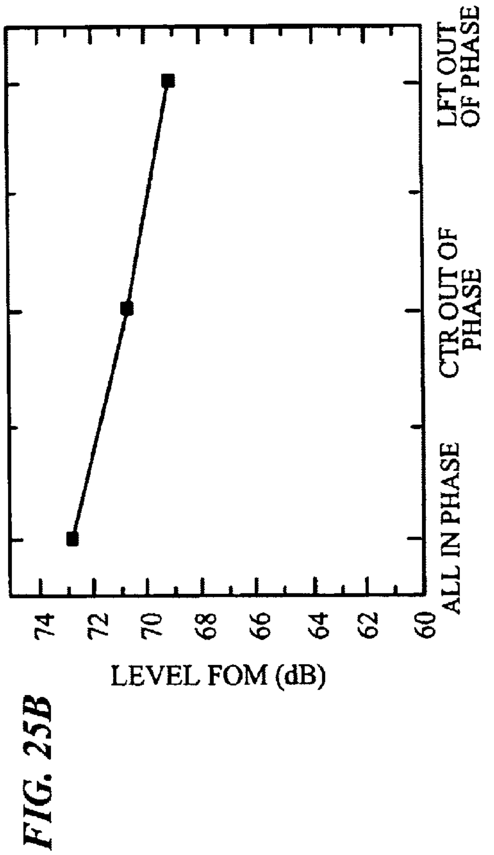
FIGS. 25A–25C are graphs illustrating performance vs. phasing of the number of piezos.
Figure 25C:
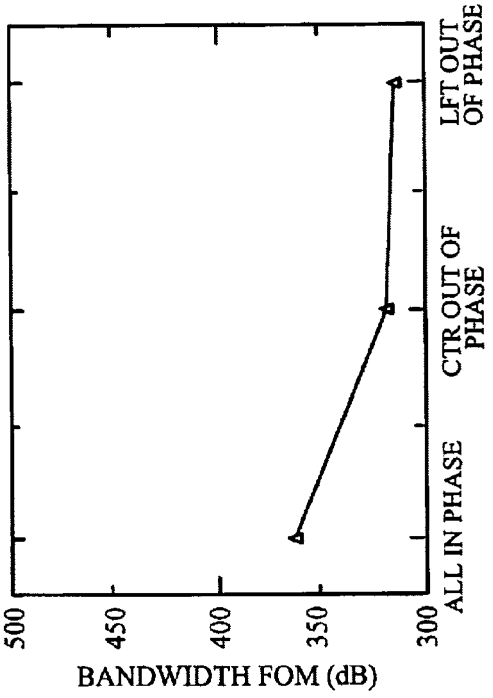
Figure 25A:
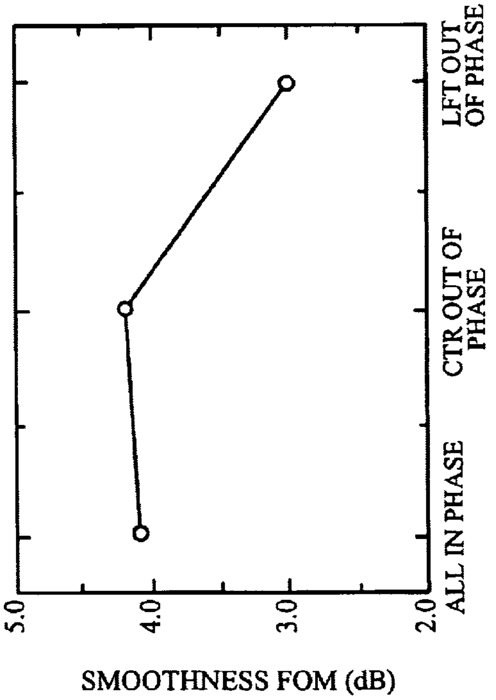
Figure 26B:
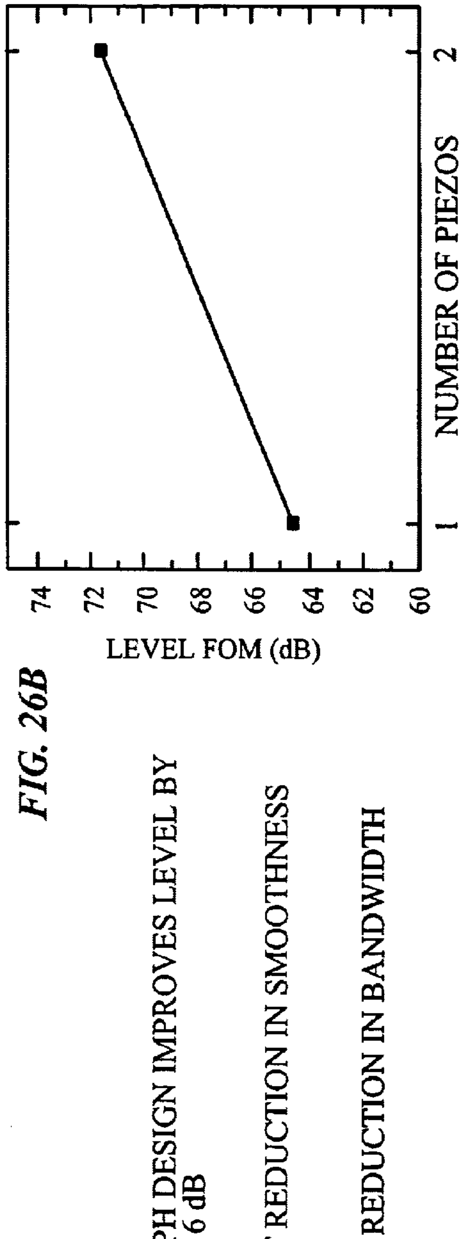
FIGS. 26A–26C are graphs illustrating performance vs. number of piezos.
Figure 26C:
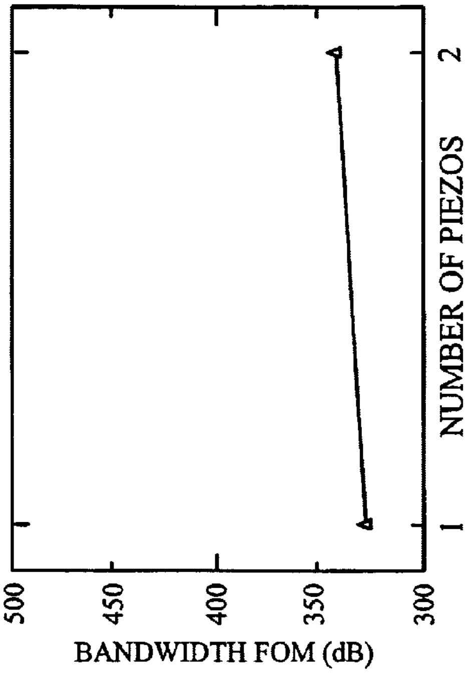
Figure 26A:
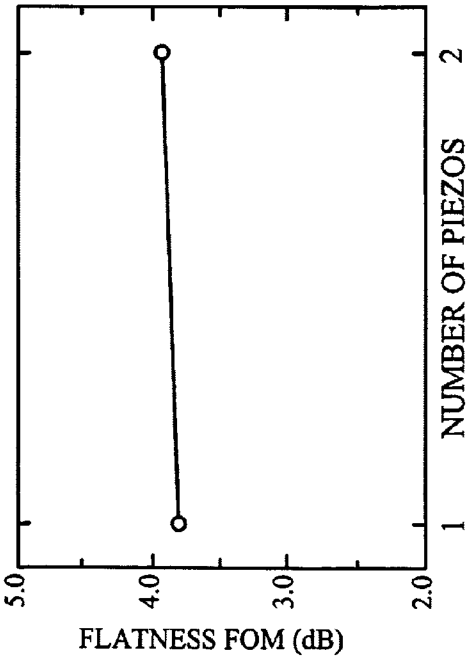

Referring now to the figures, FIG. 10 is a chart demonstrating the sound pressure level versus the frequency of a piezo speaker and a loud speaker. FIG. 11 is a graph showing the low frequency range that was obtained by the piezo bimorphs in accordance with an exemplary embodiment of the present disclosure. FIG. 12 is a graph showing the impedance gained by using a resistor in series with the piezo bimorphs. FIG. 13 is a top plan view of a configuration of the piezo bimorphs. FIG. 14 is a cross-sectional view of a piezo bi-morph configuration. FIG. 15 is a cross-sectional view illustrating an alternative configuration of the piezo bi-morph. FIG. 16 is a graph illustrating a comparison of single piezo being compared to three bi-morph piezos. FIG. 17 is a graph illustrating a comparison of the piezo bi-morphs with selective phasing. FIG. 18 is a graph illustrating a comparison of three bi-morphs versus two by morphs. FIG. 19 is a graph illustrating a comparison between three bi-morphs versus piezos on a single side. FIG. 20 is a graph illustrating a comparison between a test fixture and an instrument panel. FIGS. 21A–21C are graphs illustrating performance vs. panel thickness. FIGS. 22A–22C are graphs illustrating performance vs. panel thickness. FIGS. 23A–23C are graphs illustrating performance vs. panel thickness. FIGS. 24A–24C are graphs illustrating performance vs. number of piezos. FIGS. 25A–25C are graphs illustrating performance vs. phasing of the number of piezos. FIGS. 26A–26C are graphs illustrating performance vs. number of piezos.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An interior trim portion of a vehicle comprising an instrument panel for producing an audible sound in a vehicle, comprising:

a speaker area comprising a single layer comprising an upper surface and a lower surface, said speaker area comprising a portion of the instrument panel;

a piezo bimorph attached to said speaker area, said piezo bimorph comprising a first piezoelectric element attached to said upper surface, and a second piezoelectric element attached to said lower side and proximate to said first piezoelectric element; and an amplifier in electrical communication with said piezo bimorph, said amplifier for supplying an electrical field to said piezo bimorph, said piezo bimorph causing said speaker area to vibrate causing an audible sound, wherein said first piezoelectric clement is a piezoelectric actuator having a coating wherein, said first piezoelectric element is covered by a protective coating and electrodes are attached to said piezoelectric actuator and are disposed between said protective coating and said upper surface.

2. An interior trim portion as in claim 1, wherein said piezo bimorph is attached to said speaker area by embedding said first piezoelectric element and said second piezoelectric element in said interior trim portion.

3. A member for producing an audible sound in a vehicle, comprising:

a speaker area comprising a single layer comprising an upper surface and a lower surface, said speaker area located on said member;

a piezo bimorph attached to said speaker area, said piezo bimorph comprising a first piezoelectric element attached to said upper surface, and a second piezoelectric element attached to said lower side-end-surface proximate to said first piezoelectric element; and an amplifier in electrical communication with said piezo bimorph, said amplifier supplying an electrical field to said piezo bimorph, said piezo bimorph causing said speaker area and said member to vibrate causing an audible sound, wherein said piezo bimorph is in electrical communication and in series with a resistor.

4. A member as in claim 3, further comprising:

a second speaker area comprising a single layer comprising an upper surface and a lower surface, said second speaker area being located on said member; and a second piezo bimorph attached to said second speaker area, said second piezo bimorph comprising a first piezoelectric element attached to said second upper surface of said second speaker area, and a second piezoelectric element attached to said lower surface of said second area proximate to said first piezoelectric element.

5. A member as in claim 3, wherein said speaker area is recessed in said member.

6. A member as in claim 3, wherein said piezo bimorph further comprising three piezo bimorphs.

7. A member as in claim 3, wherein said speaker area is located at an end of said member.

8. A member as in claim 3, wherein said piezo bimorph is located at an edge of said member.

9. A member as in claim 3, wherein said first piezoelectric element is covered by a coating material other than a coating of said first piezoelectric element.

10. A member as in claim 9, wherein said coating material is paint or a liquid injection molding material.

11. A member as in claim 3, farther comprising a transformer interposed between said amplifier and said piezo bimorph, and in electrical communication with said amplifier and said piezo bimorph.

12. An interior trim portion of a vehicle comprising an instrument panel for producing an audible sound in the vehicle, comprising:

a speaker area having an upper surface and a lower surface, said speaker area located on said instrument panel;

three piezo bimorphs attached to said speaker area, said piezo bimorphs each comprising a first piezoelectric element attached to said upper surface, a second piezoelectric element attached to said lower surface and proximate to said first piezoelectric clement; and an amplifier in electrical communication with said piezo bimorphs, said amplifier supplying an electrical field to said piezo bimorph, said piezo bimorphs causing said speaker area and said instrument panel to vibrate causing an audible sound, wherein said three piezo bimorphs are located about one inch apart from each other.

13. A method of reproducing sound within a passenger cabin from an audio signal having lower, mid, and upper frequency range components, said method comprising:

covering portions of an instrument panel with a coating, the portions of the instrument panel being capable of producing a sound when vibrated by a plurality of piezo-bimorphs, said piezo-bimorphs being located on said instrument panel in a first speaker area and a second speaker area, said speaker areas producing sound when vibrated; and applying electric potential to said piezo-bimorphs to excite a pair of piezoelectric actuators of each biomorphs to vibrate said instrument panel attached thereto to produce sounds in accordance with said audio signal, one of said pair of said piezoelectric actuators being secured to an upper surface of said single layer of said instrument panel and the other being secured to a lower surface of single layer of said instrument panel, which is proximate to said one of said pair of said piezoelectric actuators, wherein said instrument panel is vibrated to create frequencies from about 300 Hz about 20,000 Hz.

14. The method as in claim 13, wherein said piezoelectric actuators are embedded into said instrument panel.

* * * * *